(12) United States Patent
Killian

(10) Patent No.: US 7,450,595 B1
(45) Date of Patent: Nov. 11, 2008

(54) METHOD AND SYSTEM FOR MANAGING MULTIPLE NETWORKS OVER A SET OF PORTS

(75) Inventor: Thomas Joseph Killian, Westfield, NJ (US)

(73) Assignee: AT&T Corp., New York, NY (US)

( * ) Notice: Subject to any disclaimer, the term of this patent is extended or adjusted under 35 U.S.C. 154(b) by 789 days.

(21) Appl. No.: 09/846,917

(22) Filed: May 1, 2001

(51) Int. Cl.
*H04L 12/56* (2006.01)

(52) U.S. Cl. .................. 370/401; 370/356; 709/227

(58) Field of Classification Search ........... 370/389, 370/413, 392, 399, 401, 406, 352, 395.54, 370/353, 354, 355, 356, 402; 709/227
See application file for complete search history.

(56) References Cited

U.S. PATENT DOCUMENTS

| | | | | |
|---|---|---|---|---|
| 5,155,858 A | * | 10/1992 | DeBruler et al. | 718/105 |
| 5,684,800 A | * | 11/1997 | Dobbins et al. | 370/401 |
| 5,764,636 A | * | 6/1998 | Edsall | 370/401 |
| 5,946,308 A | * | 8/1999 | Dobbins et al. | 370/392 |
| 6,035,105 A | * | 3/2000 | McCloghrie et al. | 709/236 |
| 6,061,334 A | * | 5/2000 | Berlovitch et al. | 370/255 |
| 6,108,330 A | * | 8/2000 | Bhatia et al. | 370/352 |
| 6,111,876 A | * | 8/2000 | Frantz et al. | 370/392 |
| 6,304,578 B1 | * | 10/2001 | Fluss | 370/413 |
| 6,539,019 B1 | * | 3/2003 | Noy et al. | 370/395.53 |
| 6,570,875 B1 | * | 5/2003 | Hegde | 370/389 |
| 6,658,015 B1 | * | 12/2003 | Merchant et al. | 370/422 |
| 6,731,596 B1 | * | 5/2004 | Chiang et al. | 370/217 |
| 6,751,191 B1 | * | 6/2004 | Kanekar et al. | 370/217 |
| 6,804,332 B1 | * | 10/2004 | Miner et al. | 379/88.13 |
| 6,839,348 B2 | * | 1/2005 | Tang et al. | 370/390 |
| 6,847,620 B1 | * | 1/2005 | Meier | 370/328 |
| 6,937,574 B1 | * | 8/2005 | Delaney et al. | 370/254 |
| 6,996,621 B1 | * | 2/2006 | Borella et al. | 709/228 |
| 2002/0019875 A1 | * | 2/2002 | Garrett et al. | 709/230 |
| 2002/0138628 A1 | * | 9/2002 | Tingley et al. | |
| 2003/0165140 A1 | * | 9/2003 | Tang et al. | 370/393 |

* cited by examiner

*Primary Examiner*—Chi H. Pham
*Assistant Examiner*—Kevin Mew

(57) ABSTRACT

A system has a switch that allows virtual private networks to be created dynamically. The system includes at least one network. The system also includes a computer having an address. The system also includes a plurality of ports for coupling to the computer. The system also includes a switch that assigns one of the plurality of ports to a private network according to the address of the computer. The switch assigns the port by correlating the address with an address list.

36 Claims, 3 Drawing Sheets

200

METHOD AND SYSTEM FOR MANAGING MULTIPLE NETWORKS OVER A SET OF PORTS

TECHNICAL FIELD

The present invention is directed to networks for exchanging information. More specifically, the present invention is directed to networks of computers that exchange information in a secure and efficient manner over a set of ports.

BACKGROUND OF THE INVENTION

As home computers and portable laptops become common, so do problems arising from using shared resources to access information over networks outside the home or office. Individuals having separate computers require access to different networks and need a secure line to exchange information. For example, one person may work for company A, and another person may work for company B. Both people desire to work via their laptops from the same physical location, such as the home or office. To work, the first person must access company A's network from a port, such as a telephone jack in the home. The second person needs to access company B's network from another port as well. Though using different ports, both people use the same physical resources to access their networks.

Local-area-network technology, such as shared Ethernet, is easy to use but is inconvenient if access to multiple separate networks is required. For each network, a set of wires is run to each room, or location, for using the network. Thus, one location may be wired for one network, while a second network is wired to another location. The users of these networks are constrained physically by the locations of the wires. Further, if outside internet access is desired, another set of wires is placed in those locations as well. Each room is separately wired.

If the network access requirements change, the wires must be physically modified to accept the new network or to remove the old one. These procedures are inconvenient for locations that are dynamic in their network requirements, such as office spaces or personal residences.

To avoid security violations and to keep network communications separate, switched as opposed to shared-Ethernet can be utilized. A switched Ethernet operates to keep virtual local area networks ("VLANs") separate.

Assignment of a port to a VLAN is performed by a network administrator. From an individual user's perspective, however, the situation is the same as in the case of a shared Ethernet.

Attempts to make network access more dynamic or accessible result in increased costs or physical demands. Telephone jacks connected to a telephone network are one such attempt to provide better network access. A user can plug in to a telephone line anywhere in an office or house and access their network of choice. The user, however, now has exclusive use of the telephone line, and other users are prevented from using the same telephone line. Hence, to access multiple networks, additional telephone lines must be placed at each location, increasing the cost of maintaining each telephone line and installing additional telephone ports in each location. Yet another deficiency is speed since telephone lines, unlike broadband network connections, do not support high bandwidth for efficient and timely network access.

Another attempt to provide better network access is by placing special software on the personal computers that connect to the networks. The special software would provide encryption capabilities to communicate to the network from a wire location. However, the software consumes memory space on the computer and would have to be executed prior to accessing the network. Further, special decryption programs would have to run at the network's server to accept the encrypted information. From the user's standpoint it is difficult simultaneously execute security software and general application on the same personal computer.

None of these attempts provide a network configuration that is dynamic and not physically constrained. The above-enumerated systems do not allow a user to move from one location to another, creating and extinguishing networks as they are needed, or secure access to networks that prevent unauthorized access without undue physical requirements.

SUMMARY OF THE INVENTION

In one embodiment, the present invention provides a system which uses a switch to manage multiple virtual networks over a set of ports. The system includes at least one network and a computer having an address. The system may also include a plurality of ports for receiving the computer and a switch that assigns one of the plurality of ports to a private network according to the address of the computer. The switch assigns the port by correlating the address with an address list residing in the memory of the system.

The present invention also relates to a method for communicating over a network from a plurality of ports wherein a computer coupled to a port issues a data packet containing the computer's address, thereupon a switch connected to a address table determines which network is accessible by the computer and assigning the network to the port coupled to the computer.

DETAILED DESCRIPTION

One embodiment of the present invention is a system that uses a switch to manage multiple virtual networks over a set of ports. The system includes a connection to a network. The system also includes a computer having an address. The system also includes a plurality of ports for receiving the computer. The system also includes a switch that assigns one of the plurality of ports to a network according to the address of the computer. The switch assigns the port by correlating the address with an address list.

Figure 1:
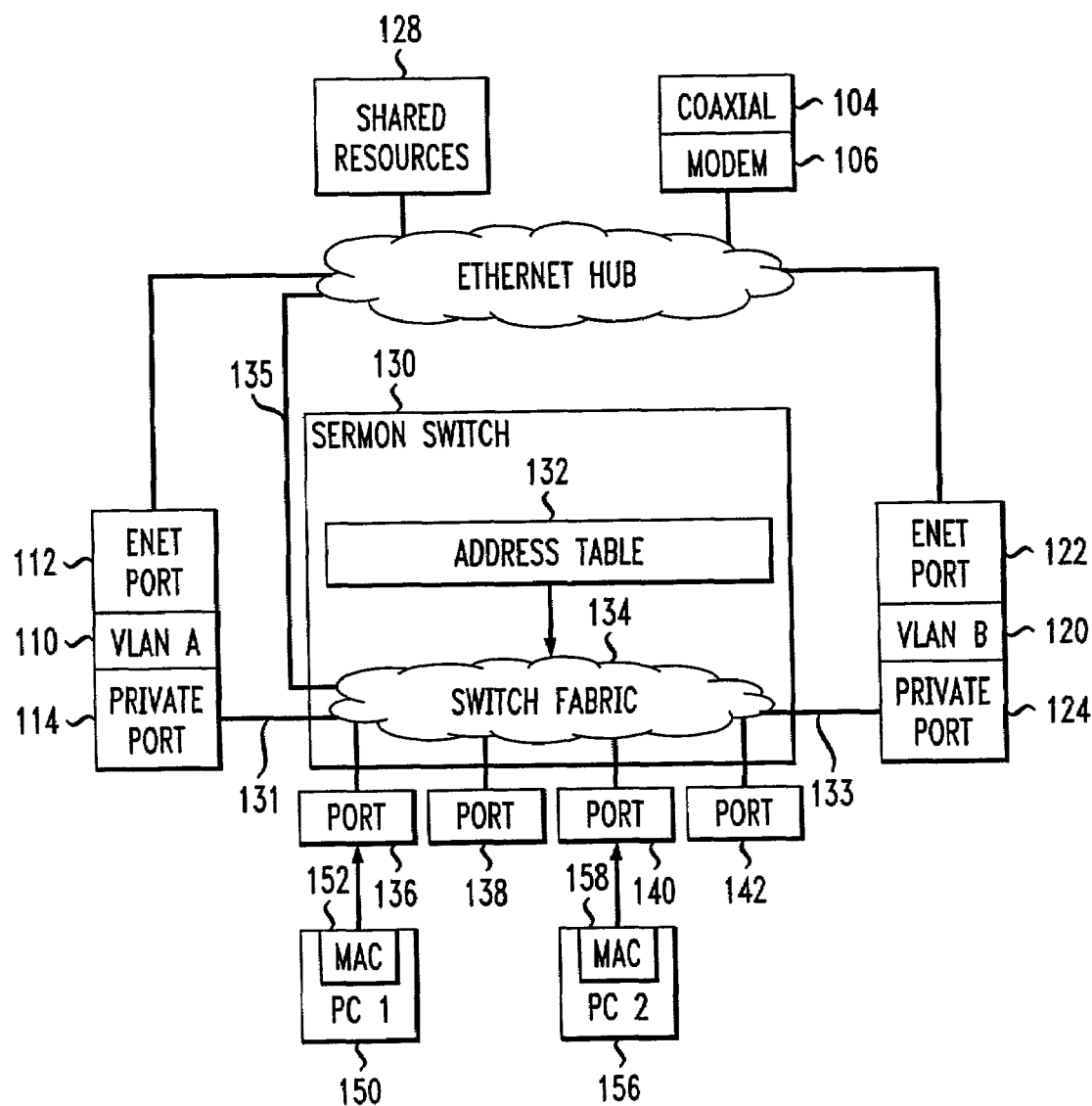
FIG. 1 illustrates a system for managing multiple networks over a set of ports in accordance with one embodiment of the present invention.

FIG. 1 depicts a system 100 for managing multiple networks over a set of ports in accordance with an embodiment of the present invention. System 100 delivers information to computers and ports at different locations, such as a home or office. System 100 also allows information to be exchanged with networks and systems outside the locations. Broadband connection 104 carries the information and data to the location. Preferably, broadband connection 104 is a coaxial cable plugged into a modem 106. Broadband connection 104 is connected to a cable service, or any service that exchanges data at a high speed (for example, at least 1 megabit per second). Modem 106 is a cable modem that enables Ethernet hub 108 to connect with the local cable television line via broadband connection 104.

Ethernet hub 108 supports an Ethernet configuration, or network, for the location that uses system 100. Ethernet hub 108 is the central point of connection for the wires from ports and nodes at the locations. Ethernet hub 108 receives information from modem 106 and sends it to the other ports. Ethernet hub 108 also receives and sends information to external systems, such virtual private networks ("VPNs"). Ethernet hub 108 also connects to virtual private network gateways such as one for virtual local area network A ("VLAN A") 110 and virtual local area network B ("VLAN B") 120. Not every network connected to Ethernet hub 108 has to be a private network. Other connections might include shared resources 128, comprised of printers, fax machines, or any devices for common use by the users of the networks connected to Ethernet hub 108.

VLAN A gateway 110 is an encrypting gateway of a type known in the art. Text packets are received on private Ethernet port 114, encrypted, and sent out on Ethernet port 112. The terms private and wild are used to distinguish between the protected and unprotected sides of the gateway. The encrypted packets are received by Ethernet hub 108 for transmission by modem 106. The packets will be received by a matching gateway established by the administrators of a network corresponding to virtual private network A (not shown).

Similarly, VLAN B gateway 120 is an encrypting gateway that receives cleartext packets on private port 124, encrypts them, and sends them out on wild port 122. The encrypted packets are likewise received by Ethernet hub 108 for transmission by modem 106. They will be received by a matching gateway established by the administrators of A corresponding virtual private network B (not shown).

Private port 114 of VLAN A gateway 110 is connected to switch 130 through port 131. Likewise, private port 124 of VLAN B gateway 120 is connected to switch 130 through port 133.

As opposed to a shared medium, switch 130 provides a switched architecture between ports within system 100. Ports are grouped together into VLANs. The VLAN that includes port 131 is referred to as VLAN A. Port 131, by virtue of its connection to private port 114 on gateway 110, is connected to VLAN A for this reason. Likewise, port 133 belongs to VLAN B. Port 135 is connected directly to hub 108. The VLAN that includes port 135 does not correspond to any external VPN, and is called the dirty VLAN.

Switch 130 also is connected to ports 136, 138, 140 and 142. Ports 136, 138, 140 and 142 are in different rooms or physical locations within the house or office of system 100. The ports allow a user to connect a computer, such as a laptop or other personal computer ("PC"), to switch 130 to access the networks connected at ports 131 and 133. For example, PC 150 (also identified as PC 1) and PC 156 (also identified as PC 2) may connect to ports 136 and 140, respectively. PC 150 and port 136 can be in one room or location, while PC 156 and port 140 are in another. PC 150 includes Media Access Control ("MAC") address 152 and PC 156 includes MAC address 158. MAC addresses 152 and 158 are unique hardware numbers correlating to their respective computers. In this embodiment, the MAC addresses are the Ethernet addresses for their respective computers. The MAC address of a computer will uniquely distinguish that computer from all others when connected to system 100.

As PCs connect to a port, a VLAN is assigned to this port by switch 130 based upon the MAC address of the computer. In this manner, switch 130 may dynamically add and delete ports on VLANs as they are needed. Switch 130 includes switch fabric 134, which is the internal wiring that connects VLANs to the individual ports. Each port has its own wire connecting to switch 130.

An address table 132 is stored at switch 130 and has the MAC addresses of the computers that may connect to switch 130. Address table 132 may be a file with data for each address. Each MAC address within address table 132 may correlate to a virtual private network ("VPN") accessible to the PC with the MAC address. Address table 132 is dynamic in that it may be changed or updated. MAC addresses may be added or deleted as users change.

Switch 130 executes a serially monogamous protocol that ensures that a PC connected to a port always is connected to the correct VPN. For example, PC 150 has a MAC address 152 that correlates to VPN A. When switch 130 first receives a packet from PC 150, switch 130 will extract MAC address 152 from the packet header, and will look up MAC address 152 in address table 132. Then, switch 130 will assign port 136 to VLAN A, as described above. If the user of PC 150 disconnects from port 136 and moves to port 138, then switch 130 will disconnect port 136 from VLAN A and assign port 138 to VLAN A. Subsequently, the user of PC 156, whose MAC address 158 correlates to VPN B, may connect to port 136. Switch 130 will assign port 136 to VLAN B.

Figure 2:
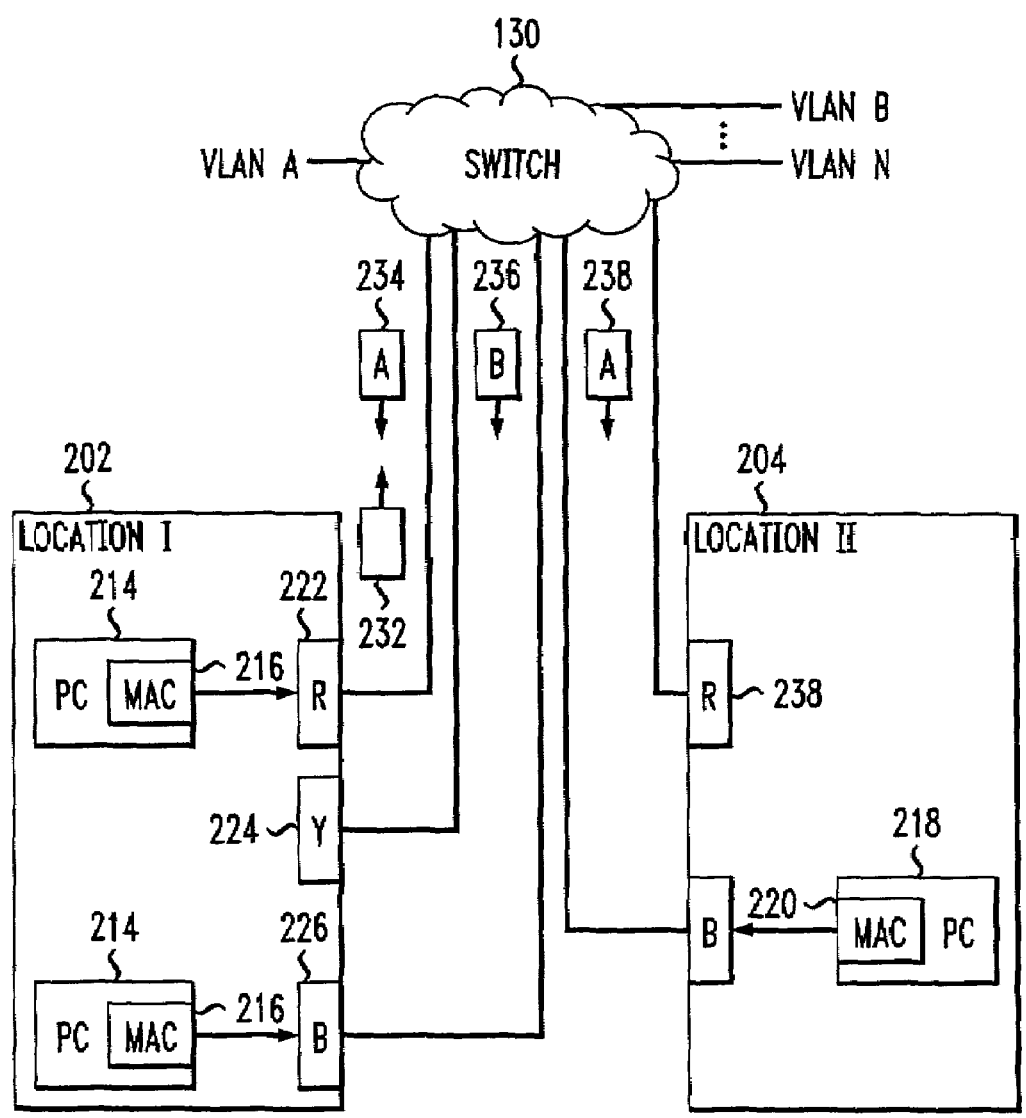
FIG. 2 illustrates a switch exchanging information to a set of ports in accordance with one embodiment of the present invention.

FIG. 2 depicts a switch exchanging information to a set of ports in accordance with an embodiment of the present invention. Switch 130 corresponds to switch 130 in FIG. 1. Switch 130 is connected to a plurality of private networks and Ethernet hub 108 receives information and data from these networks when accessed by a user. Switch 130 also is connected to a set of ports in different physical locations. For example, location 202 in FIG. 2 is a first location having ports connected to switch 130, and location 204 is a second location having ports connected to switch 130. Location 202 includes ports 222 and 226. Location 204 includes ports 228 and 230. Locations 202 and 204 may be rooms within a house that have the ports in the rooms. Alternatively, locations 202 and 204 may be any area that has a set of ports located in it, such as a cubicle within a workplace or an office. Locations 202 and 204 also may not be limited physically and only may be distinguishable in that they define a group of ports.

Ports 222, 224 and 226 are connected to switch 130 by wires that may have different colors. The different colors enable users to distinguish the ports from each other. For example, port 222 may connect with a red wire, depicted as "R" in FIG. 2. Ports 224 and 226 may connect with yellow and blue wires, respectively. Preferably, the wires are not materially distinct from each other. The different colors would help in visually showing how the wires are routed. Alternatively, the wires might be different in bandwidth specifications or other performance capabilities. Location 204 has ports 228 and 230 that are connected with red and blue wires, respectively. Thus, all wiring that runs to switch 130 terminates on separate ports.

Through the wires to the ports in locations 202 and 204, switch 130 exchanges information and data between the PCs and the VLANs coupled to switch 130. Users couple their PCs to the ports, which are connected to switch 130 by their wires. For example, location 202 might have two users using PC 210 and PC 214. PC 210 has MAC address 212. PC 214 may include MAC address 216. Addresses 212 and 216 may identify their respective PCs to switch 130. According to FIG. 2, the user of PC 210 desires to connect to port 222. After PC 210 is connected, it sends a discover packet 232 to switch 130 to connect to a VLAN coupled to switch 130. Discover packet 232 contains information about PC 210, including address 212. Switch 130 receives discover packet 232 and looks up address 212 within the address table 132, as depicted in FIG. 1. Address 212 correlates to an Internet Protocol ("IP") address for one of the private networks coupled to switch 130. Address 212 determines the VLAN to be assigned to port 222 to support PC 210, according to address table 132. Switch 130 assigns the VLAN to port 222 and begins to send information, such as data packet 234, to PC 210. In an exemplary embodiment, data packet 234 may be from VLAN A. Thus, the user of PC 210 can use VLAN A to work and exchange data. In another embodiment not shown in FIG. 2, VLAN A may correspond to external VPN A.

Other users may connect to other ports and connect to other virtual private networks. The user of PC 214 sends address 216 to switch 130. Address 216 correlates to VLAN B, and VLAN B may be assigned to port 226. Data packet 236 is sent to PC 214 with information from VLAN B. In location 204, the user of PC 218 connects to port 230. PC 218 sends a discover packet with address 220 to switch 130. Address 220 identifies VLAN A as the network supporting PC 218. Thus, switch 130 may assign VLAN A to port 230. Therefore, according to the embodiment described above, switch 130 can configure virtual private networks dynamically by assigning the networks to ports as users having PCs connect to the ports. Ports are not hard wired to specific networks and users may not be limited to specific locations. Thus, ports may have one of the following states: dead, alive and assigned to a VLAN, and alive and unassigned ("dirty"). A dead port may be unable to support any networks.

Further, the embodiment of the present invention depicted in FIG. 2 may allow a user to disconnect from a port and reconnect to another port. Thus, the VLAN connection is torn down and reconnected elsewhere. For example, the user of PC 210 may wish to go to location 204 and reconnect to VLAN A. PC 210 is disconnected from port 222. Switch 130 detects that PC 210 is disconnected and terminates VLAN A's connection to port 222. This termination prevents access to the external VPN after the user of PC 210 is finished. Thus, the embodiment of the present invention can prevent accidental or unauthorized access to a VLAN as a result of a user disconnecting from a port and another user connecting thereto. The user of PC 210 can then connect to the network through location 204 and port 228. After the connecting to port 228, switch 120 assigns VLAN A to port 228, thus changing the VLAN configuration. Therefore, the configuration of the networks through switch 130 depends on the MAC addresses seen on the ports.

If switch 130 receives a discover packet containing an unknown MAC address, then switch 130 may act in a number of different ways. Service may be denied completely. Switch 130 may attempt to connect an appropriate VLAN by eliciting additional information from the user. This information may or may not be stored permanently in address table 132. The user may be assigned to the "dirty" VLAN, such as port 135 depicted in FIG. 1. In addition, switch 130 may consider connection to multiple VPNs, but might require the user to provide additional information, such as selecting the network to be assigned to the port.

As depicted in FIG. 2, ports 224 and 228 are not assigned to any virtual private networks. These ports are assigned to "dirty" local area networks by default. By being assigned to dirty VLANs, these ports will not receive any data packets from existing VLANs set up by switch 130. Instead, ports 224 and 228 will have direct access to modem 106 through port 135 and hub 108, as depicted in FIG. 1.

Figure 3:
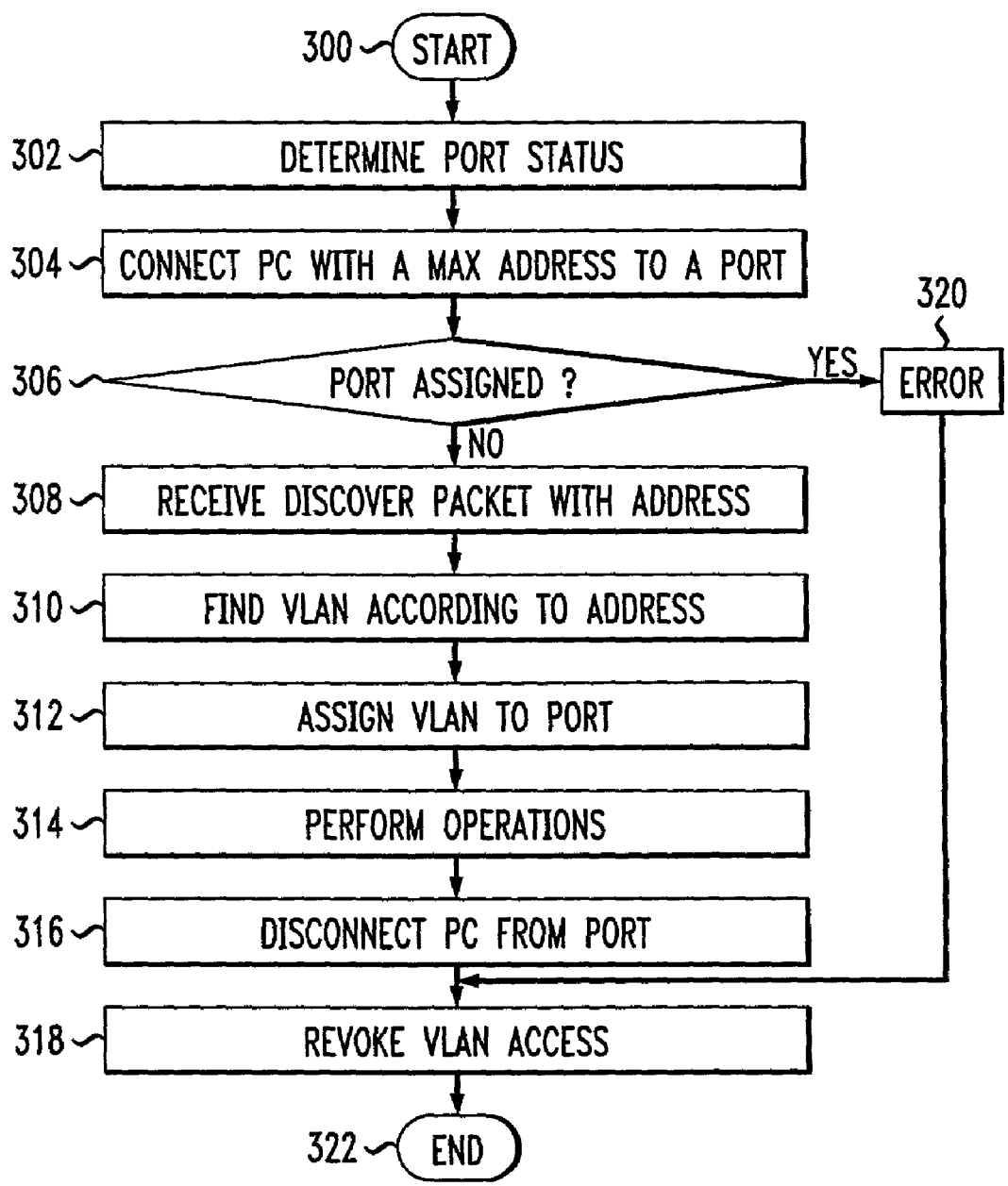
FIG. 3 illustrates a flowchart of a method for managing multiple networks over a set of ports in accordance with another embodiment of the present invention.

FIG. 3 depicts a flowchart of a method for managing multiple networks over a set of ports in accordance with an embodiment of the present invention. Step 300 is the start of the method. Step 302 executes by switch 130 determining the port status for the wired ports. As discussed above, ports may be dead, assigned or dirty. Step 304 executes by connecting a PC with a MAC address to a port wired to switch 130. For example, referring back to FIG. 2, PC 210 with address 212 connects to port 222. Step 306 executes by determining whether the port is already assigned to a VLAN. An assigned port may be accessed only by a PC belonging to the same VLAN. If the answer at step 306 is no, then step 308 is executed by receiving discover packet 232 at switch 130. Switch 130 receives address 212 of PC 210 with discover packet 232. If the answer at step 306 is yes, then step 320 is executed by noting an error has occurred and that further steps are to be taken to correct the error. For example, an alarm may be raised that a security violation has occurred.

Step 310 executes by switch 130 finding a private network that matches the address received in step 308. Switch 130 queries address table 132 to determine the proper VLAN to establish and assign to the port. Using the example described above, address table 132 would contain a list that shows network A matching address 212. Step 312 executes by assigning the VLAN found in step 310 to the port. Port 222 is assigned VLAN A. Step 314 executes by allowing the user to perform operations and receive information from the assigned VLAN, and corresponding VPN, through the port and switch 130. PC 210 receives and sends information to VLAN A via port 222. Step 316 executes by the user disconnecting the PC from the port to terminate operations. PC 210 is disconnected from port 222. Step 318 executes by revoking VLAN access at the port and terminating operations. The port is marked as "dead". Step 322 ends the method.

It may be seen that a switch is disclosed that allows a plurality of VLANs associated with different VPNs to be created dynamically. The switch includes an address table that contains addresses that correlate to outside networks accessible by the switch. When the switch receives the address from a personal computer or other processing device, it matches the address to a network in the address table. The switch then establishes a VLAN and assigns it to the port connecting the personal computer to the switch. The outside network is accessible by the user through the switch. When the user removes the computer from the port, the switch destroys the association between the VLAN and the port. Another user may connect to the port and establish a different VLAN connection corresponding to the address of the computer. In addition, the original user may connect to another port connected to the switch and obtain a new connection to the original VLAN. The switch may be compatible with existing Ethernet hubs to provide dynamic network capabilities to a plurality of locations.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system for exchanging information on a network, comprising:
   a switch coupled to a plurality of ports;
   an address table;
   a transient computer having an address, said transient computer coupled to one of said plurality of ports; and a plurality of private networks, wherein each of said plurality of private networks is compatible with each of said plurality of ports and one of said plurality of private networks is dynamically assigned to any one of said plurality of ports in response to a detected connection to said transient computer by said switch according to said address table, wherein said transient computer communicates with said one of said plurality of private networks via said one of said plurality of ports and said switch.

2. The system of claim 1, wherein said plurality of private networks are virtual local area networks.

3. The system of claim 1, wherein said address table is stored at said switch.

4. The system of claim 1, wherein said address table includes said address to identify said transient computer.

5. The system of claim 4, wherein said address is a media access control address.

6. The system of claim 1, wherein said switch includes a wire to said one of said plurality of ports.

7. The system of claim 1, further comprising an Ethernet switch for controlling an Ethernet network.

8. The system of claim 1, further comprising a broadband connection connecting said network with an external virtual private network.

9. A method for communicating over a network from a plurality of ports, the method comprising:
   issuing a data packet having an address from a transient computer connected to one of a plurality of ports;
   determining one of a plurality of networks accessible by said transient computer according to an address table using said address; and
   assigning dynamically said one of said plurality of networks to any one of said plurality of ports by a switch coupled to said plurality of ports in response to a detected connection to said transient computer, wherein said one of said plurality of ports is compatible with each of said plurality of networks and wherein said transient computer communicates with said one of said plurality of networks via said one of said plurality of ports and via said switch.

10. The method of claim 9, further comprising determining if said one of said plurality of ports is assigned.

11. The method of claim 9, further comprising accessing said address table containing said address.

12. The method of claim 11, further comprising updating said address table.

13. The method of claim 9, further comprising unassigning said one of said plurality of ports when said transient computer is disconnected from said one of said plurality of networks.

14. The method of claim 9, further comprising sending an alarm message when said address does not correspond to said one of said plurality of networks.

15. The method of claim 9, further comprising receiving data from said one of said plurality of networks at said one of said plurality of ports.

16. The method of claim 9, further comprising accessing shared resources from said one of said plurality of ports.

17. A method for assigning an external network to one of a plurality of ports using a switch, comprising:
   receiving data from said external network;
   sending a data packet to said one of said plurality of ports;
   retrieving an address from said one of said plurality of ports in response to said data packet;
   creating a virtual network correlating to said external network; and
   assigning dynamically said virtual network to any one of said plurality of ports in response to a detected connection to a transient computer according to said address, wherein said virtual network is compatible with each of said plurality of ports and wherein communication between said virtual network and said one of said plurality of ports connected to said transient computer occurs via said switch.

18. The method of claim 17, further comprising finding said address in an address table at said switch.

19. The method of claim 17, wherein said receiving step includes receiving said data via an Ethernet hub.

20. A switch coupled to a broadband connection, and connected to a plurality of ports, comprising:
   an address table listing addresses that correspond to a plurality of private networks;
   a switch fabric coupled to said plurality of ports to support said plurality of private networks; and
   a transient computer connected to any one of said plurality of ports and dynamically assigned to one of said plurality of private networks in response to a detected connection to said transient computer, wherein said any one of said plurality of ports is compatible with each of said plurality of private networks, and said transient computer communicates with said one of said plurality of private networks via said any one of said plurality of ports and via said switch.

21. The switch of claim 20, further comprising a memory that stores said address table.

22. The switch of claim 20, wherein said addresses are deleted and added to said address table.

23. A switch that assigns ports, said switch coupled to a computer-readable medium, said computer-readable medium having instructions stored thereon, the instructions comprising steps for:
   receiving data from an external network;
   sending a data packet to one of a plurality of ports connected to a transient computer;
   retrieving an address from said one of said plurality of ports in response to said data packet;
   creating a virtual network correlating to said external network; and
   assigning dynamically said virtual network to any one of said plurality of ports connected to said transient computer according to said address in response to a detected connection to said transient computer, wherein said virtual network is compatible with each of said plurality of ports and wherein said transient computer communicates with said virtual network via said one of said plurality of ports and via said switch.

24. The switch of claim 23, further comprising switch fabric coupling said switch to said plurality of ports.

25. A broadband connection system, comprising:
   an Ethernet hub for supporting a plurality of virtual private networks; and
   a switch having an address table to dynamically assign one of said plurality of virtual private networks to any one of a plurality of ports connected to a transient computer according to an address table in response to a detected connection to said transient computer, wherein said one of said plurality of virtual private networks is compatible with each of said plurality of ports and wherein said transient computer communicates with said one of said virtual private networks via said one of said plurality of ports and via said switch.

26. The broad band connection system of claim 25, further comprising said plurality of ports coupled to said switch, wherein said one of said plurality of virtual private networks is assigned to said one of said plurality of ports.

27. The broad band connection system of claim 25, further comprising an address stored in said address table, said address correlating to said one of said plurality of virtual private networks.

28. A method for exchanging information over one of a plurality of virtual local area networks at one of a plurality of ports, comprising:
   coupling a transient computer at said one of said plurality of ports;
   issuing a data packet having an address from said transient computer to a switch;
   identifying said one of said plurality of virtual local area networks according to said address;
   assigning dynamically said one of said plurality of virtual local area networks to any one of said plurality of ports in response to a detected connection to said transient computer, wherein said one of said plurality of virtual local area networks is compatible with each of said plurality of ports;
   accessing said one of said plurality of virtual local area networks with said transient computer at said one of said plurality of ports via said one of said plurality of ports and via said switch; and
   exchanging information over said one of said plurality of virtual local area networks from said transient computer to a virtual private network, wherein said virtual private network corresponds to said address.

29. The method of claim 28, wherein said identifying includes accessing an address table at said switch, said address table storing said address corresponding to said one of said plurality of virtual local area networks.

30. The method of claim 28, further comprising revoking access at said one of said plurality of ports when said one of said plurality of virtual local area networks is terminated.

31. The method of claim 28, further comprising blocking said transient computer from said one of said plurality of virtual local area networks when said address is not identifiable by said switch.

32. A system for exchanging information from a plurality of ports to external private networks, comprising:
   a switch coupled to said plurality of ports, said switch including an address table;
   a plurality of virtual local area networks created by said switch, wherein each of said plurality of virtual local area networks is compatible with each of said plurality of ports and wherein one of said plurality of virtual local area networks is dynamically assigned to any one port of said plurality of ports according to an address in said address table in response to a detected connection to a transient computer, said transient computer coupled to said port, said transient computer including said address correlating to said one of said plurality of virtual local area networks; and
   a modem coupled to said switch via an Ethernet hub, said modem to exchange information from said one of said plurality of virtual local area networks assigned to said port to an external virtual private network corresponding to said transient computer.

33. The system of claim 32, further comprising a broadband connection to said modem, said broadband connection including said external virtual private network.

34. The system of claim 32, wherein said address table is stored as a file.

35. The system of claim 32, further comprising a private port coupling said one of said plurality of virtual local area networks to said switch.

36. The method of claim 9, further comprising:
   detecting a disconnection of said transient computer from said one of said plurality of ports;
   terminating said assignment of said one of said plurality of networks to said one of said plurality of ports in response to detecting said disconnection of said transient computer;
   detecting a connection of said transient computer to a different port of said plurality of ports; and
   assigning dynamically said one of said plurality of networks to said different port of said plurality of ports in response to said detected connection of said transient computer to said different port of said plurality of ports.

* * * * *